Figure 1:
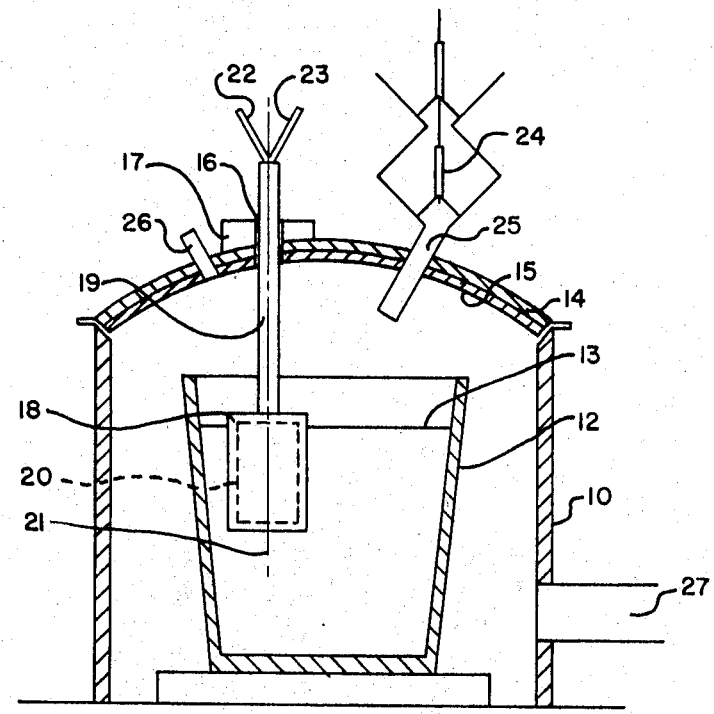

United States Patent

[11] 3,626,073

| [72] | Inventors | Gunther Sindelar<br>Dusseldorf;<br>Edgar Steier, Mulheim-Ruhr; Horst Stockman, Bredenscheid-Stuter, all of Germany |
|---|---|---|
| [21] | Appl. No. | 39,071 |
| [22] | Filed | May 20, 1970 |
| [45] | Patented | Dec. 7, 1971 |
| [73] | Assignee | Friedrich Kocks |
| [32] | Priority | May 22, 1969 |
| [33] | | Germany |
| [31] | | P 19 26 290.9 |

[54] MEANS FOR HEATING AND TREATING MOLTEN METAL UNDER VACUUM
7 Claims, 2 Drawing Figs.

[52] U.S. Cl.................................................. 13/31, 75/49, 266/34
[51] Int. Cl............................................... F27d 3/00, F27d 3/10

[50] Field of Search........................................... 13/1, 31, 20, 25, 6, 27, 34; 266/34 R, 34 A, 34 T, 34 V; 259/DIG. 18; 219/381, 403, 427, 523, 209; 75/49, 61

[56] References Cited
UNITED STATES PATENTS

| 3,459,536 | 8/1969 | Touzalin et al. | 266/34 A X |
| 3,278,295 | 10/1966 | Ostberg et al. | 75/61 |
| 3,109,913 | 11/1963 | Galajda, Jr. | 219/209 X |
| 1,692,270 | 11/1928 | Jensen | 219/523 X |

Primary Examiner—Bernard A. Gilheany
Assistant Examiner—R. N. Envall, Jr.
Attorney—Buell, Blenko & Ziesenheim ABSTRACT: An apparatus is provided for heating and treating molten metals under vacuum which includes a container for a charge of molten metal, a cover removably sealing said container, at least one rotatable heated stirrer journaled in said cover and extending into said container, means for rotating said stirrer and means for heating the stirrer.

PATENTED DEC 7 1971 3,626,073

INVENTORS
Gunther Sindelar,
Edgar Steier &
Horst Stockmann

MEANS FOR HEATING AND TREATING MOLTEN METAL UNDER VACUUM

This invention relates to means for heating and treating molten metal under vacuum and particularly to a container or similar device with a roof for heating and treating of molten metals under vacuum, whereby the devices used for degassing, alloying, homogenizing, heating and other treating of the charge are arranged at the roof.

An electric melting furnace has already been proposed wherein a bar-type heater element consisting of carbon or graphite is arranged parallel to the furnace wall, reaching vertically into the furnace and arranged besides a turnable melting pot which contains the melting charge. This device offers no possibilities to insert the heater element into the melting pot and to heat the melt directly.

The same shortcomings are found in another known furnace arrangement, provided with a fixed melting pot for the melting charge whereby the heater elements are arranged under the melting pot with the outer ends of the heater elements located in the furnace wall and the inner ends supported in the furnace by a special resistance material which is used as the current conductor. The required current flow from the heater elements through a resistance material is another disadvantage.

Still another known device shows the heater elements arranged vertically besides the melting pot, and also reaching into a resistance material inside the furnace which serves as current conductor, thus having the same shortcomings described above.

Ladle furnaces using a vacuumtight lockable roof equipped for vacuum degassing and treating of molten metals are known. One such device for degassing of metals and other melts uses a roof having only an inlet opening and a suction socket, while another device uses a roof with only an inlet opening and an observation hole.

The roof of another known vacuum container, using a converted tapping ladle is equipped with a funnel-type charging bucket for charging of the melt, a suction socket for the vacuum pipe, a gate for charging of alloy materials or similar and a television camera for the control of the treatment process. Any devices for heating and moving the melt inside the container are not provided.

Further known is a round furnace container with a roof, whereby this roof is equipped with a charging pipe, a suction pipe and electrodes which reach vertically into the slag above the molten metal.

The roof of another type of ladle furnace used for magnesium melting is equipped with several heating elements and a charging device. This roof, however, is fixed to the ladle and cannot be taken off. The heating elements attached to the roof do not reach into the molten metal.

The purpose of this invention is to eliminate the shortcomings and disadvantages of all the above-described known devices, and to build a ladle having a removable roof whereby the devices for heating and treating of the melt are arranged at the roof.

The ladle of the present invention is mainly intended to receive molten metals from the melting furnace shortly after they are liquified, and to provide and hold the required temperature for refining, alloying, homogenizing or other treating of the melt.

This is achieved with the proposed ladle for heating and treating of metal melts under vacuum in such a way that the ladle roof, which can seal the ladle vacuumtight, is provided with an inlet opening that can be closed vacuumtight, with a vacuumtight sealed observation hole, and with one or several stirrers which can be entered into the melt from the top and which are movable and adjustable in their axial direction and also can rotate around their axis.

All the devices provided for heating, stirring, treating and observing of the melt according to this invention have been arranged at the roof and can be transported together with the roof. It is of special advantage that one or several stirrers, which can also be heated, are arranged at the roof in such a manner that they can be moved in their axial direction from the top into the melt and held there at any desired height, and furthermore that they can be rotated around their axis. This way it is possible to reach and hold any desired temperature of the melt at any height, and at the same time to stir the melt. The required supply lines for heating and moving of the stirrers, the drives and other equipment, can be arranged at/or connected to the roof completely or partially in a very advantageous manner.

The heatable stirrer is held at its bearing support portion in a vacuumtight sealed roof opening provided with a support, and can be rotated and also moved in the axial direction. The support portion of the stirrer can be a rod, pipe or any otherwise shaped body which also supports all the required delivery and exhaust pipes.

The roof opening and the support for the stirrer can be arranged at the center or off center on the roof, depending on the prevailing requirements to bring the stirrer into the center or into an offcenter position in the melt inside the ladle.

It is a characteristic, that one or several heating elements are arranged at the stirrer and connected to in and out-going lines or pipes for supply of the heating medium, whereby the lines or pipes are connected to the stirrer support at or above the roof.

Accordingly, the stirrer can be provided with one or several heating elements. The heating element designed such as an immersion-type heater, pipe or hollow body, or any other suitable-type heater element, is located inside the stirrer and assembled to it in such a way that heating element and stirrer form one heatable unit. The heating medium is supplied through special lines from the roof to the heating element and returned back to the roof in the same way. The melt to be treated is not used as a carrier for the heating medium. Supply and operation of the heating element is independent from the metal to be treated.

The stirrer is preferably equipped with an electric-resistance heating element. A heating element consisting of wire or another electric-resistance material is located and accordingly insulated at the heating portion. The electric current required for the heating can be supplied in a simple manner through cables attached to the support portion and running from the roof to the heating section and back. It is therefore possible to build the stirrer fully or partially as an immersion-type heating element, and to provide the required devices for adding the heating elements and the insulation.

It is a feature of the invention that the stirrer can have a heating section which can be heated by gaseous, liquid or other mediums. The heating section can feature pipe or other hollow-shaped excavations, through which the intended heating medium can be channelled.

It is of advantage to make heating and moving of the stirrer two operations independent of each other. Thus it is for example possible first to position the stirrer in the desired position in the melt and/or to set in motion the melt in the ladle by rotating the stirrer. In turn, it is also possible that the heating function is turned on or off for shorter or longer periods of time, with a constant or variable intensity, while the stirrer is in a fixed position. It is, however, also possible that moving and heating of the stirrer can take place at the same time.

If desired, heating and moving of the stirrer are operations that can depend on each other. This can be of advantage or required if the melt can only be heated when moved, or in reversion, should be moved and heated at the same time. This can be achieved in a simple manner by arranging a switch or another device for combined control and regulation of the moving and heating of the stirrer.

Rotation and axial movement and adjustment of the stirrer are operations that can be executed independent of each other. Thus it is for example possible, depending on the prevailing requirements, to move the stirrer in the axial direction with or without heating, and to adjust it to a desired height in the melt, stop it, and rotate the stirrer only then continuously or intermittently at a constant or changeable speed.

Axial movement and adjustment and rotation of the stirrer are preferably actuated completely or partially by a motor or another drive.

The stirrer can be of oval, multicornered, star-type or any other section and/or can have any other shapes serving better treatment of the melt. The stirrer can be made in full or in part out of flat material, round material, pipe material or any other material, and can have the configuration of a screen, shovel or spoon, or any other suitable shape for heat-treatment and stirring of the melt.

A characteristic is that the inlet opening at the roof can be closed vacuumtight by a vacuum lock or similar device. Thus it is possible to make at any time additions required for the treatment of the melt, without interfering with the vacuum in the ladle.

If required, the roof can be provided with a connecting opening or the like. This opening, in the form of a pipe socket or similar, makes it possible to connect the required suction device at the roof if it is not possible or not desired to make the connection at the ladle.

Another characteristic is that the roof can be transported together with the devices mounted to it. Thus, it is possible to assemble, exchange or repair all the devices or only an individual device on the roof independent of the ladle at a separate location. Thus, the roof with all its devices can be moved ready for operation to the ladle.

Figure 2:
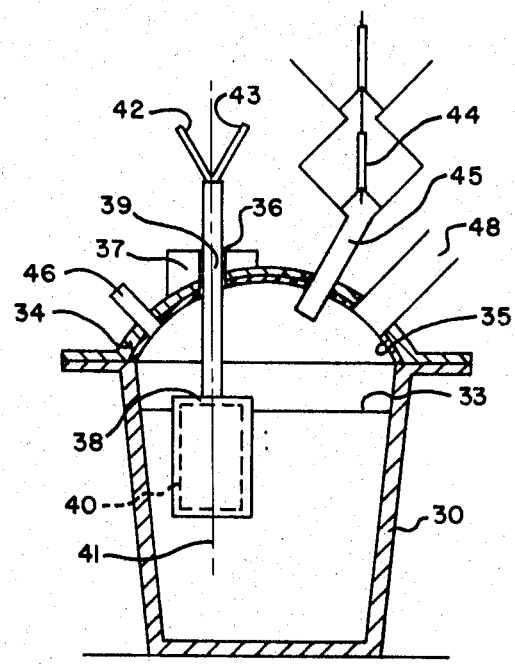

In the foregoing general description of our invention we have set out certain objects, purposes and advantages. Other objects, purposes and advantages of our invention will be apparent from a consideration of the following description and the accompanying drawings in which:

FIG. 1 is a section through a melting ladle within a separate roofed container according to our invention, and FIG. 2 is a section through a roofed melting ladle according to our invention.

Referring to the drawings and particularly to FIG. 1 we have illustrated a closed container 10 receiving a ladle 12 of molten metal 13. The container 10 is provided with a removable vacuumtight roof 14, preferably provided with a layer of insulation 15. A heatable stirrer 18 is mounted on the lower end of a hollow rotatable shaft 19 which is journaled for rotation and held supported above the ladle in journal box 17 mounted on roof 14 and provided with a vacuumtight sealed roof opening 16. This support is built in such a way that stirrer 18 having a heating part 20 at its inside is movable in the axial direction and can be inserted from the top in offcenter position into the open ladle 12 with the melt 13, and furthermore can be rotated around its axis 21. The stirrer 18 consisting of refractory materials can be built in an oval, multicornered or star-type section, or any other section, and can also have other suitable forms or shapes. Moving and rotating of the stirrer 18 can take place independent of each other, driven by a motor or drive not shown on attached drawing. The heating part 20 can be switched on or off together with or independent of the axial movement and/or rotating of the stirrer 18. The supply and discharge lines of the heating medium required for the functioning of heating part 20 takes place over supply lines 22 and discharge lines 23 arranged at the upper end of support bar 19.

An inlet opening 25 that can be locked vacuumtight by a vacuum-lock 24 or the like, is arranged at roof 14 and allows charging of additions or the like to the melt 13. A vacuumtight sealed observation opening 26 or the like has been provided at roof 14 in order to control and observe the treatment process inside the container 10. A connecting opening 27 or the like has been provided at the container 10 for the connection of a suction line or similar devices for creating and holding the required vacuum.

The stirrer 18 located off center at the roof 14 can also be inserted from the top right into the middle of ladle 12. In order to achieve that, it is only required to move ladle 12 inside the container 10 sideways far enough so that the stirrer 18 will be in the desired position above ladle 12.

Another possibility is to provide only or additionally a roof opening 16 and support 17 in the center of roof 14 in order to insert stirrer 18 in the center of the open ladle 12 located in the middle of container 10 or to insert it off center into the sideways moved ladle 12.

In the design according to FIG. 2, the molten metal 33 is contained in a vacuumtight locked ladle or melting pot 30. Also located at roof 34 are the stirrer 38 on shaft 39 journaled in journal box 37 with vacuumtight opening 36, the charge opening 45 with vacuum lock 44 and the observation opening 46. The connection of the suction line creating the vacuum, or for other devices is however not located at the ladle 30 in this design, but in this case a connection opening 48 or the like, is located at the roof 34. The stirrer rotates around axis 41. The roof 34 is provided with a layer of insulation 35 and the stirrer 38 is heated by a heater 40 both for the purpose of controlling the heat in the ladle. The supply of heating medium for the heat 40 is delivered through supply line 42 and discharge line 43.

While we have set out certain preferred practices and embodiments of our invention in the foregoing specification it will be understood that this invention may be otherwise embodied within the scope of the following claims.

We claim:

1. Apparatus for heating and treating molten metals under vacuum comprising a container for a charge of molten metal to be treated, a cover removably adapted to seal said container at the top, at least one rotatable heated stirrer journaled in said cover and adapted to extend into said container, means connected to said stirrer for rotating said stirrer, means connected to said stirrer for heating the stirrer, a vacuumtight charging opening in said cover spaced from said stirrer, a vacuumtight observation opening in said cover spaced from said stirrer and said charging opening and a vacuum connection in said roof whereby said container may be evacuated and simultaneously heated, stirred and a charge added all under visual observation and all under vacuum.

2. An apparatus as claimed in claim 1 wherein the heated stirrer is journaled for rotation about its axis in a vacuum sealed journal box on said roof.

3. An apparatus as claimed in claim 1 wherein at least one heating element is arranged within the stirrer and provided with supply and discharge lines for carrying a heating medium thereto.

4. An apparatus as claimed in claim 3 wherein the heating element is an electric resistance element.

5. An apparatus as claimed in claim 3 wherein the heating element is a heated fluid media carrier.

6. An apparatus as claimed in claim 1 wherein the heating function is independent of rotation of the stirrer.

7. An apparatus as claimed in claim 1 wherein the heating function is dependent upon rotation of the stirrer.

* * * * *

UNITED STATES PATENT OFFICE
CERTIFICATE OF CORRECTION

Patent No. 3,626,073      Dated December 7, 1971

Inventor(s) Gunther Sindelar, et al

It is certified that error appears in the above-identified patent and that said Letters Patent are hereby corrected as shown below:

On the cover sheet, the third inventor's name should read -- Horst Stockmann --.

Signed and sealed this 24th day of October 1972.

(SEAL)
Attest:

EDWARD M. FLETCHER, JR.
Attesting Officer

ROBERT GOTTSCHALK
Commissioner of Patents